(12) United States Patent
Hamaguchi

(10) Patent No.: US 12,070,083 B2
(45) Date of Patent: Aug. 27, 2024

(54) CHARGING DEVICE AND INFORMATION PROCESSING SYSTEM

(71) Applicant: JAPAN TOBACCO INC., Tokyo (JP)

(72) Inventor: Hideshi Hamaguchi, Portland, OR (US)

(73) Assignee: JAPAN TOBACCO INC., Tokyo (JP)

( * ) Notice: Subject to any disclaimer, the term of this patent is extended or adjusted under 35 U.S.C. 154(b) by 919 days.

(21) Appl. No.: 17/129,345

(22) Filed: Dec. 21, 2020

(65) Prior Publication Data

US 2021/0106066 A1 Apr. 15, 2021

Related U.S. Application Data

(63) Continuation of application No. PCT/JP2018/028532, filed on Jul. 31, 2018.

(51) Int. Cl.
*A24F 40/90* (2020.01)
*A24F 40/60* (2020.01)
*A24F 40/65* (2020.01)

(52) U.S. Cl.
CPC .............. *A24F 40/90* (2020.01); *A24F 40/60* (2020.01); *A24F 40/65* (2020.01)

(58) Field of Classification Search
CPC .......... A24F 40/60; A24F 40/65; A24F 40/90; H02J 7/0048; H02J 7/00034
See application file for complete search history.

(56) References Cited

U.S. PATENT DOCUMENTS

| | | | |
|---|---|---|---|
| 6,609,072 B1 | 8/2003 | Yamagata | |
| 11,944,130 B2 * | 4/2024 | Anderson | .......... H01R 13/6205 |
| 2014/0253049 A1 | 9/2014 | Iwamoto | |
| 2015/0224268 A1 | 8/2015 | Henry et al. | |

(Continued)

FOREIGN PATENT DOCUMENTS

| | | |
|---|---|---|
| CN | 104037835 A | 9/2014 |
| CN | 105848503 A | 8/2016 |

(Continued)

OTHER PUBLICATIONS

Korean Office Action for Korean Application No. 10-2023-7018929, dated Jul. 1, 2023, with English translation.

(Continued)

*Primary Examiner* — Marcus E Harcum
(74) *Attorney, Agent, or Firm* — Birch, Stewart, Kolasch & Birch, LLP

(57) ABSTRACT

A technology is provided that can flexibly adjust power consumption in a system in which a charging device for charging an aerosol generation device communicates with a terminal device, the power consumption being due to said communication. An operating method for a terminal device communicates with a charging device for charging an aerosol generation device. The method includes a step in which charging information relating to a battery of the charging device is acquired from the charging device; a step in which a charging status of the battery is evaluated on the basis of the charging information; and a step in which the possibility or impossibility of communication between the terminal device and the charging device is determined on the basis of the charging status.

20 Claims, 15 Drawing Sheets

(56) References Cited

U.S. PATENT DOCUMENTS

| | | | | |
|---|---|---|---|---|
| 2015/0245667 A1* | 9/2015 | Memari | ................. | G01F 23/00 |
| | | | | 131/329 |
| 2015/0333542 A1* | 11/2015 | Alarcon | ................. | H02J 7/007 |
| | | | | 131/328 |
| 2016/0013524 A1 | 1/2016 | Maruoka | | |
| 2017/0127224 A1 | 5/2017 | Nakano | | |
| 2017/0258136 A1 | 9/2017 | Hawes et al. | | |
| 2017/0347718 A1 | 12/2017 | Nakano et al. | | |
| 2019/0014824 A1* | 1/2019 | Yazbeck | ............... | A61M 15/06 |
| 2019/0081499 A1* | 3/2019 | Sun | .................... | H02J 7/00034 |
| 2019/0387796 A1* | 12/2019 | Cohen | .................... | A24F 40/30 |
| 2020/0212691 A1* | 7/2020 | AbuEideh | ........... | H02J 7/00036 |
| 2021/0050746 A1* | 2/2021 | Malan | .................... | H02J 7/0048 |

FOREIGN PATENT DOCUMENTS

| | | | |
|---|---|---|---|
| EP | 3251530 A1 | 12/2017 | |
| JP | 1-138929 A | 5/1989 | |
| JP | 11-167440 A | 6/1999 | |
| JP | 2004-187058 A | 7/2004 | |
| JP | 2005-244633 A | 9/2005 | |
| JP | 2006-203475 A | 8/2006 | |
| JP | 2007-110820 A | 4/2007 | |
| JP | 2016-83069 A | 5/2016 | |
| JP | 2018-537749 A | 12/2016 | |
| JP | 2017-85405 A | 5/2017 | |
| JP | 2017-512459 A | 5/2017 | |
| KR | 10-2008-0100717 A | 11/2008 | |
| KR | 10-2018-0045000 A | 5/2018 | |
| TW | 201635930 A | 10/2016 | |
| WO | WO 2014/132737 A1 | 9/2014 | |
| WO | WO-2014150247 A1 * | 9/2014 | ............ A24F 40/50 |
| WO | WO 2014/199233 A2 | 12/2014 | |
| WO | WO 2015/042329 A1 | 3/2015 | |
| WO | WO 2017/055793 A1 | 4/2017 | |

OTHER PUBLICATIONS

International Search Report (PCT/ISA/210) issued in PCT/JP2018/028532, mailed on Oct. 23, 2018.
Korean Office Action for Korean Application No. 10-2021-7003299, dated Sep. 30, 2022, with a English translation.
Extended European Search Report for European Application No. 18928915.0, dated May 11, 2022.
Japanese Notice of Reasons for Refusal for Japanese Application No. 2023-075478, dated Aug. 9, 2023, with an English translation.
Japanese Notice of Reasons for Refusal for Japanese Application No. 2022-025234, dated Jun. 5, 2023, with English translation.
Japanese Notice of Reasons for Refusal for Japanese Application No. 2023-075478, dated Jun. 5, 2023, with English translation.
Taiwanese Office Action and Search Report, dated Dec. 11, 2020, for Taiwanese Application No. 107126501, with an English translation.
Chinese Office Action and Search Report for Chinese Application No. 201880096181.9, dated Dec. 20, 2023, with English translation.
Taiwanese Office Action and Search Report for Taiwanese Application No. 111114849, dated Mar. 17, 2023, with English translation.

* cited by examiner

CHARGING DEVICE AND INFORMATION PROCESSING SYSTEM

CROSS REFERENCE TO RELATED APPLICATIONS

The present application is a continuation application of International Application No. PCT/JP2018/028532, filed on Jul. 31, 2018.

TECHNICAL FIELD

The present disclosure relates to a charging device for charging an aerosol generation device, an operating method for a terminal device that communicates with the charging device, a program causing the terminal device to execute the method, and a system provided with these.

BACKGROUND ART

PTL 1 discloses a technology that can collect charging session data by connecting a computing device to a charging accessory device. The communication between the computing device and the charging accessory device requires predetermined power consumption. Since the capacity of a power storage device of the charging accessory device is limited, a situation may arise in which the above-described power consumption should be reduced.

However, PTL 1 merely discloses that the computing device and the charging accessory device communicate with each other. In PTL 1, nothing is disclosed about perception regarding a problem of power consumption due to the communication between these devices and a technology that may solve this problem.

CITATION LIST

Patent Literature

PTL 1: Japanese Translation of PCT International Application Publication No. 2017-512459

SUMMARY OF INVENTION

Technical Problem

The present disclosure has been made in view of the above-described point.

An object of the present disclosure is to provide a technology that can flexibly adjust power consumption in a system in which a charging device for charging an aerosol generation device communicates with a terminal device, the power consumption being due to the communication.

Another object of the present disclosure is to provide a technology for appropriately performing a communication connection between the charging device and the terminal device.

Solution to Problem

According to embodiments of the present disclosure, there is provided an operating method for a terminal device that communicates with a charging device for charging an aerosol generation device including acquiring, from the charging device, charging information relating to a battery in the charging device, evaluating a charging status of the battery based on the charging information, and determining, based on the charging status, whether communication between the terminal device and the charging device is permitted.

In an embodiment, the method further includes instructing the charging device to transmit the charging information to the terminal device, when it is determined, based on the charging status, that a remaining amount of charge of the battery is equal to or greater than a first threshold, and instructing the charging device not to transmit the charging information to the terminal device, when it is determined, based on the charging status, that the remaining amount of charge of the battery is less than the first threshold.

In an embodiment, the method further includes releasing a communication connection with the charging device, when it is determined, based on the charging status, that the remaining amount of charge of the battery is less than a second threshold.

In an embodiment, the method further includes instructing the charging device to transmit the charging information to the terminal device regardless of the remaining amount of charge of the battery, when the battery receives supply of electric power via a power interface in the charging device.

In an embodiment, the method further includes instructing the charging device to transmit the charging information to the terminal device regardless of the remaining amount of charge of the battery, when the communication connection with the charging device is first established.

In an embodiment, the method further includes issuing notification to prompt a user to charge the battery, when it is determined, based on the charging status, that the remaining amount of charge of the battery is less than a third threshold.

In an embodiment, the method further includes issuing notification to prompt a user to perform the communication connection between the terminal device and the charging device, when the communication connection is not performed for at least a predetermined time period.

In an embodiment, the method further includes a step of, when the terminal device does not receive the charging information from the charging device, estimating charging information based on transition of the charging information stored for the battery when not being charged.

In addition, according to embodiments of the present disclosure, there is provided a program causing a terminal device to perform the above-described method, the terminal device communicating with a charging device for charging an aerosol generation device.

In addition, according to embodiments of the present disclosure, there is provided a charging device for charging an aerosol generation device, the charging device including a battery, a power interface for supplying electric power to the battery, a control unit, and a communication unit. The control unit is configured to transmit charging information relating to the battery, via the communication unit, to a terminal device that communicates with the charging device, and to receive, from the terminal device, information as to whether communication between the terminal device and the charging device is permitted, which is determined by the terminal device based on a charging status of the battery evaluated from the charging information.

In an embodiment, the control unit is further configured to transmit the charging information to the terminal device via the communication unit when a remaining amount of charge of the battery is equal to or greater than a first threshold, and not to transmit the charging information to the terminal device when the remaining amount of charge of the battery is less than the first threshold.

In an embodiment, the control unit is further configured to release a communication connection with the terminal device when the remaining amount of charge of the battery is less than a second threshold.

In an embodiment, the control unit is further configured to transmit the charging information to the terminal device via the communication unit regardless of the remaining amount of charge of the battery, when the battery receives supply of electric power via the power interface.

In an embodiment, the control unit is further configured to transmit the charging information to the terminal device via the communication unit regardless of the remaining amount of charge of the battery, when the communication connection with the terminal device is first established.

In an embodiment, the control unit is further configured to, when receiving an instruction for charging the battery from the terminal device, charge the battery in response to the instruction, in a case where the remaining amount of charge of the battery is less than a third threshold.

In an embodiment, the control unit is further configured to, when receiving, from the terminal device, an instruction for performing the communication connection with the terminal device, perform the communication connection in response to the instruction, in the case where the communication connection between the terminal device and the charging device is not performed for at least a predetermined time period.

In an embodiment, the charging device further includes a charging port for supplying the electric power to the aerosol generation device, a first path provided between the battery and the charging port to supply the electric power from the battery to the aerosol generation device, and a second path provided between the power interface and the charging port to supply the electric power from the power interface to the aerosol generation device not via the battery.

In an embodiment, the control unit is further configured to control to charge a battery in the aerosol generation device in preference to the battery in the charging device, when the aerosol generation device is connected to the charging device via the charging port.

In an embodiment, the charging device further includes a first notifying unit for issuing notification about the charging status of the battery in the aerosol generation device, and a second notifying unit for issuing notification about the charging status of the battery in the charging device.

In addition, according to embodiments of the present disclosure, there is provided a system including the charging device as described above, the terminal device, and a server that transmits and receives data to and from the terminal device.

Advantageous Effects of Invention

According to embodiments of the present disclosure, there can be provided a technology that can flexibly adjust power consumption in a system in which a charging device for charging an aerosol generation device communicates with a terminal device, the power consumption being due to the communication. In addition, according to embodiments of the present disclosure, there can be provided a technology for appropriately performing a communication connection between the charging device and the terminal device.

DESCRIPTION OF EMBODIMENTS

Hereinafter, embodiments of the present disclosure will be described in detail with reference to the drawings.

Figure 1:
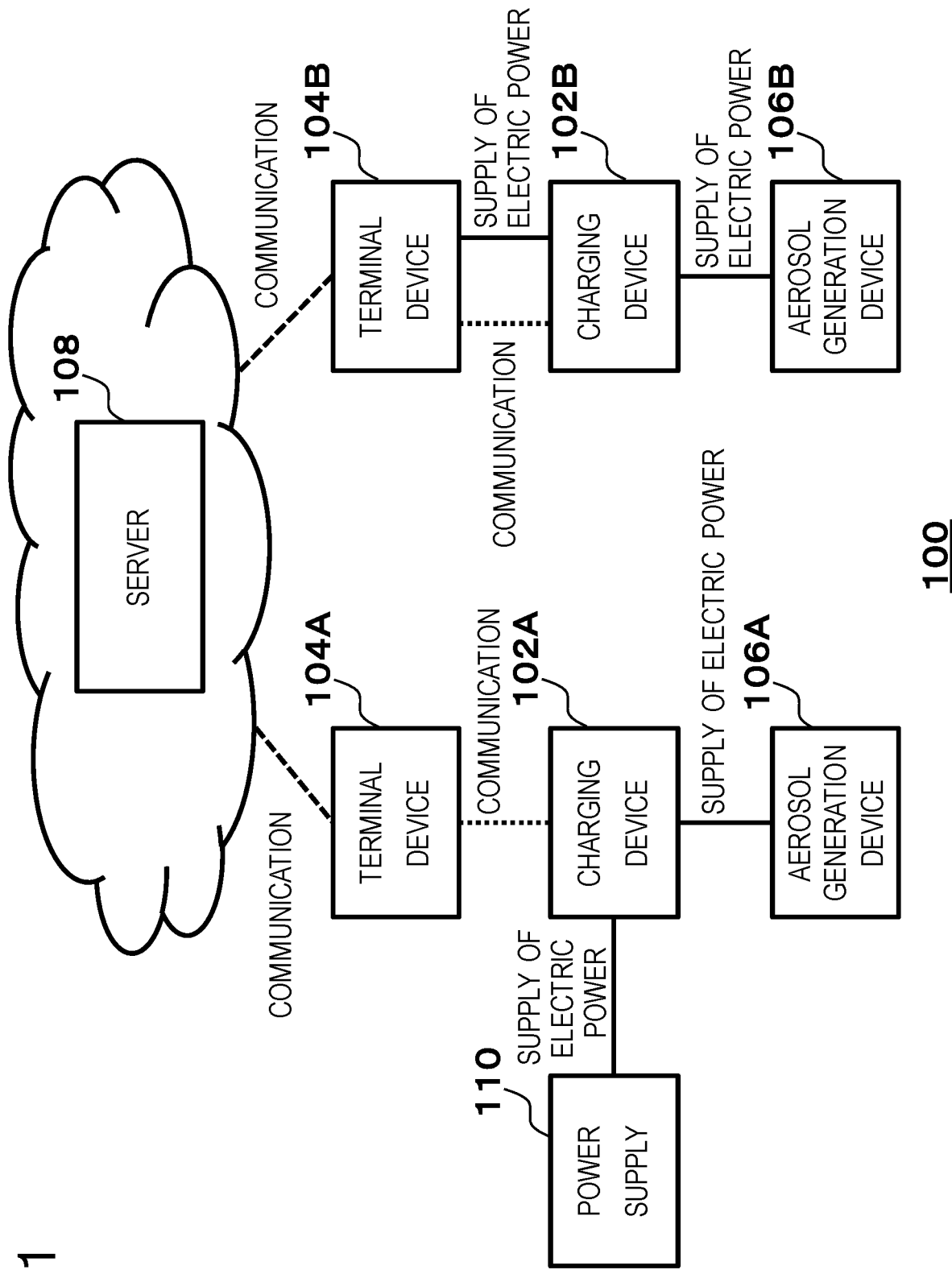
FIG. 1 illustrates a system including a charging device for charging an aerosol generation device and a terminal device that communicates with the charging device, according to an embodiment of the present disclosure.

FIG. 1 illustrates a system including a charging device for charging an aerosol generation device and a terminal device that communicates with the charging device, according to an embodiment of the present disclosure.

A system 100 includes charging devices 102A and 102B (hereinafter also collectively referred to as a "charging device 102"), terminal devices 104A and 104B (hereinafter also collectively referred to as a "terminal device 104"), aerosol generation devices 106A and 106B (hereinafter also collectively referred to as an "aerosol generation device 106"), and a server 108, as well as a power supply 110.

In the embodiments of the present disclosure, the aerosol generation device (6 may include an electronic cigarette inhalation device, a heated cigarette inhalation device, and a nebulizer, but is not limited to these. The aerosol generation device 106 may include various devices for generating aerosol to be inhaled by a user.

The aerosol generation device 106A receives supply of electric power from the charging device 102A, and generates aerosol to be inhaled by a user. The charging device 102A may be supplied with the electric power from the power supply 110.

The terminal device 104 may be, for example, a smartphone, a tablet terminal, a mobile phone, a personal computer, or other electronic devices. In the system 100, the terminal device 104 is configured to be capable of communicating with the server 108 disposed on the global network (cloud network) through wired connection or wireless connection.

As indicated by a dashed line drawn between the charging device 102A and the terminal device 104A, the charging device 102 and the terminal device 104 are configured to be capable of communicating with each other through local network such as Bluetooth (registered trademark). In addition, as indicated by a solid line drawn between the charging device 102B and the terminal device 104B, the charging device 102 may be also configured to be supplied with the electric power from a universal serial bus (USB) terminal or the like of the terminal device 104.

Figure 2:
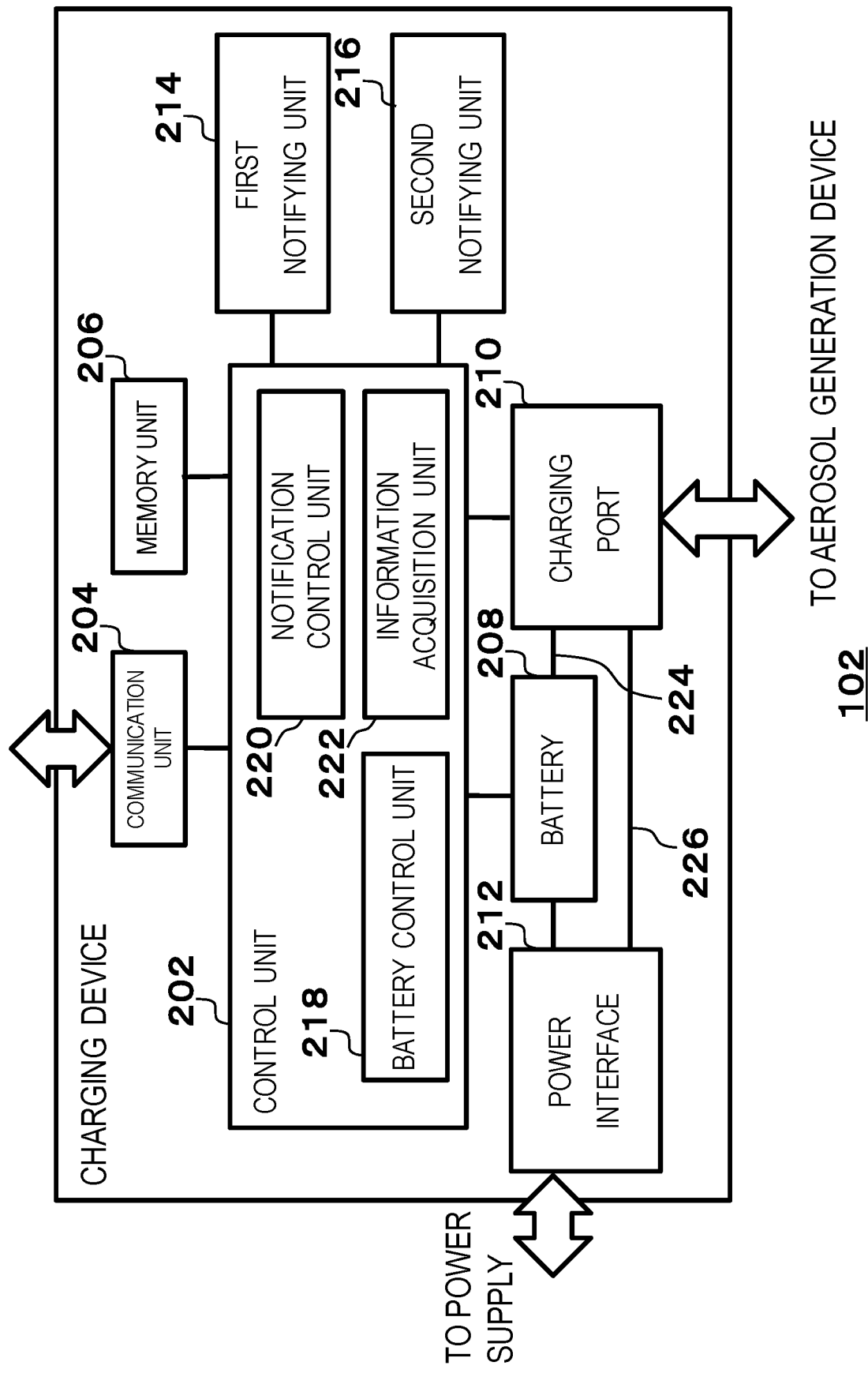
FIG. 2 is a block diagram schematically illustrating a configuration of the charging device according to an embodiment of the present disclosure

FIG. 2 is a block diagram schematically illustrating a configuration of the charging device according to an embodiment of the present disclosure. In this example, the charging device 102 includes a control unit 202, a communication unit 204, a memory unit 206, a battery 208, a charging port 210, a power interface 212, a first notifying unit 214, and a second notifying unit 216.

The communication unit 204 is an interface that provides a function for connecting the charging device 102 to the terminal device 104. Byway of example, the communication unit 204 may be a Bluetooth low energy (BLE) module, but a configuration of the communication unit 204 is not limited to this configuration. The communication unit 204 may be configured to communicate with the terminal device 104 according to other communication standards including Wi-Fi.

The memory unit 206 stores various information that is acquired or generated by the control unit 202.

The power interface 212 is an interface that provides a function of supplying the electric power to the charging device 102 from the power supply 110 such as a personal computer (PC) or a USB power supply. The power interface 212 is, for example, a USB interface, and supplies the electric power through USB connection. In this case, the power interface 212 receives supply of the electric power via a USB terminal provided in a device such as a PC or a USB power supply. The power interface 212 is not limited to the USB interface, and may be various interfaces including a Micro USB interface, a power supply plug, and an interface capable of being charged in a non-contact manner, which can supply the electric power to the charging device 102.

The battery 208 is a rechargeable battery, and is supplied and charged with the electric power from the device connected to the charging device 102 via the power interface 212. The battery 208 may be, for example, a Li—Po battery. The battery 208 may also have a function of supplying the electric power to the aerosol generation device 106 connected to the charging port 210.

Figure 3:
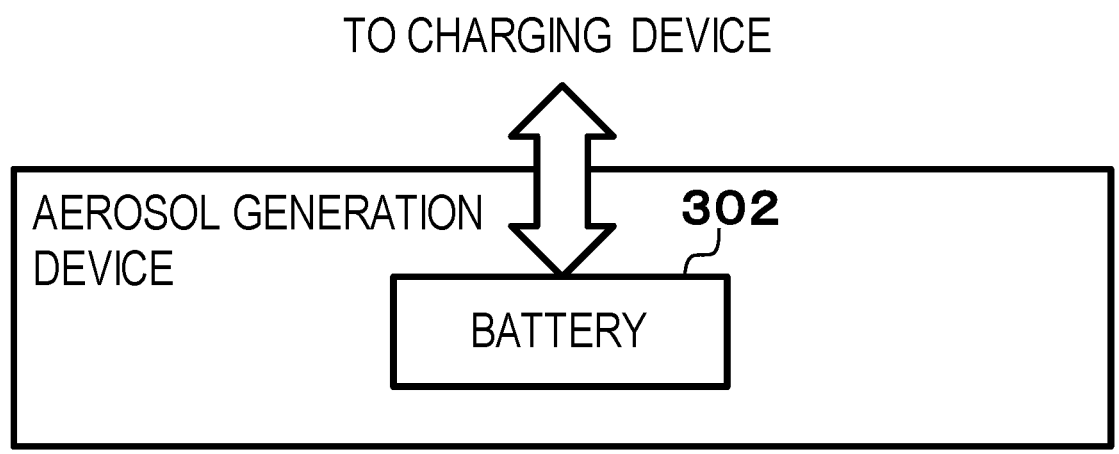
FIG. 3 is a block diagram schematically illustrating a configuration of an aerosol generation device according to an embodiment of the present disclosure.

FIG. 3 is a block diagram schematically illustrating a configuration of the aerosol generation device according to an embodiment of the present disclosure. As illustrated in FIG. 3, the aerosol generation device 106 includes a battery 302. Although not illustrated, the aerosol generation device 106 may also include various components such as a reservoir unit for holding an aerosol source, an atomizing unit for generating aerosol from the aerosol source, and a control unit for controlling the components in the aerosol generation device 106. The battery 302 is a rechargeable battery, and is charged by receiving supply of the electric power from the charging device 102. The battery 302 is, for example, a Li—Po (Lithium-ion Polymer) battery. The battery 302 supplies the electric power to each unit in the aerosol generation device 106.

Returning to FIG. 2, the charging port 210 is configured to allow the aerosol generation device 106 to be connected to the charging device 102. In an example, the charging port 210 is configured to physically contact or be connected to the aerosol generation device 106, and is used for the power supply to the aerosol generation device 106. The charging port 210 may be also configured to physically contact or be connected to the aerosol generation device 106 via, for example, a screw-type terminal. Alternatively, the charging port 210 may be also configured to supply the electric power to the aerosol generation device 106 without physically contacting the aerosol generation device 106, by other methods such as connection via a cable, and non-contact power supply. The charging port 210 may be also used for transmitting and receiving information between the charging device 102 and the aerosol generation device 106.

As illustrated in FIG. 2, the charging device 102 may also include a first path 224 provided between the battery 208 and the charging port to supply the electric power from the battery 208 to the aerosol generation device 106 via the charging port 210. The charging device 102 may also include a second path 226 provided between the power interface 212 and the charging port 210 to supply the electric power from the power interface 212 to the aerosol generation device 106 via the charging port 210 not via the battery 208.

The control unit 202 controls each component in the charging device 102. By way of example, the control unit 202 may include a battery control unit 218 for controlling the power supply to the battery 208 in the charging device 102 and the power supply to the battery 302 in the aerosol generation device 106, a notification control unit 220 for controlling the first notifying unit 214 and the second notifying unit 216, and an information acquisition unit 222 for acquiring various information such as a remaining amount of charge of the battery 208. Alternatively, the control unit 202 may be also configured to have similar functions to those of these components.

The battery control unit 218 may be configured to control to charge the battery 302 in the aerosol generation device 106 in preference to the battery 208 in the charging device 102, when the aerosol generation device 106 is connected to the charging device 102 via the charging port 210.

The first notifying unit 214 is configured to notify the control unit 202 of information (remaining amount of charge, and the like) relating to the battery 302 in the aerosol generation device 106. The second notifying unit 216 is configured to notify the control unit 202 of information (remaining amount of charge, and the like) relating to the battery 208 in the charging device 102. In an example, the first notifying unit 214 and the second notifying unit 216 may also include a plurality of LEDs. In another example, the first notifying unit 214 and the second notifying unit 216 may also include a speaker, a vibrator, or the like.

The notification control unit 220 controls the first notifying unit 214 so that the first notifying unit 214 notifies the control unit 202 of the information relating to the battery 302 in the aerosol generation device 106. In an example, the first notifying unit 214 may also include five ultra-small white LEDs which are surface mounted. This configuration is merely an example, and another number of LEDs may be used or a light source having an alternative configuration may be used. In this case, the notification control unit 220 may blink a first LED when a remaining amount of charge of the battery 302 is less than 20% of the maximum value, may light the first LED and blink a second LED when the remaining amount of charge is not less than 20% and less than 40%, may light the first and second LEDs and blink a third LED when the remaining amount of charge is not less than 40% and less than 60%, may light the first to third LEDs and blink a fourth LED ben the remaining amount of charge is not less than 60% and less than 80%, may light the first to fourth LEDs and blink a fifth LED when the remaining amount of charge is not less than 80% and less than 100%, and may light the first to fifth LEDs when the battery 302 is completely charged. In another example, when the first notifying unit 214 includes a speaker, the notification control unit 220 may also control the first notifying unit 214 so that the first notifying unit 214 outputs the information to be notified, as sound. In still another example, when the first notifying unit 214 includes a vibrator, the notification control unit 220 may also control the first notifying unit 214 so that the first notifying unit 214 outputs the information to be notified, as vibration.

The notification control unit 220 controls the second notifying unit 216 so that the second notifying unit 216 notifies the control unit 202 of the information relating to the battery 208 in the charging device 102. The second notifying unit 216 may also include five ultra-small white LEDs which are surface mounted. This configuration is merely an example, and another number of LEDs may be used or a light source having an alternative configuration may be used. In this example, during charging of the battery 208, the notification control unit 220 may blink a first LED when a remaining amount of charge of the battery 208 is less than 20% of the maximum value, may light the first LED and blink a second LED when the remaining amount of charge is not less than 20% and less than 40%, may light the first and second LEDs and blink a third LED when the remaining amount of charge is not less than 40% and less than 60%, may light the first to third LEDs and blink a fourth LED when the remaining amount of charge is not less than 60% and less than 80%, and may light the first to fourth LEDs and blink a fifth LED when the remaining amount of charge is not less than 80% and less than 100%. In addition, when the battery 208 is not being charged, the notification control unit 220 may light the first LED when a remaining amount of charge of the battery 208 is less than 20% of the maximum value, may light the first and second LEDs when the remaining amount of charge is not less than 20% and less than 40%, may light the first to third LEDs when the remaining amount of charge is not less than 40% and less than 60%, may light the first to fourth LEDs when the remaining amount of charge is not less than 60% and less than 80%, and may light the first to fifth LEDs when the remaining amount of charge is not less than 80% and less than 100%. Note that, even when the battery 208 is completely charged, the notification control unit 220 may light the first to fifth LEDs. When an error occurs, the notification control unit 220 may also cause a predetermined LEDs to emit light in a manner associated in advance with the error. In another example, when the second notifying unit 216 includes a speaker, a vibrator or the like, the notification control unit 220 may also control the second notifying unit 216 in the method as described above with respect to the first notifying unit 214.

The information acquisition unit 222 acquires the information relating to the battery 302 in the aerosol generation device 106, the information relating to the battery 208 in the charging device 102, and the like. The information relating to the battery may include various information including a remaining amount of charge of the battery, information relating to reduction in the remaining amount of charge of the battery, a time period required for charging the battery, information indicating degradation of the battery, the number of times of charging of the battery, a time period elapsed since the last charging of the battery, and the date and time when charging of the battery is completed and the history thereof. In addition, the information acquisition unit 222 may acquire the information indicating that the aerosol generation device 106 is connected to the charging device 102. The information indicating that the aerosol generation device 106 is connected to the charging device 102 may include the information relating to the date and time when the aerosol generation device 106 is connected to the charging device 102 and the history thereof. In addition, the information acquisition unit 222 may acquire the information indicating that the charging device 102 is connected to the power supply 110. The information indicating that the charging device 102 is connected to the power supply 110 may include the information relating to the date and time when the charging device 102 is connected to the power supply 110 and the history thereof.

Figure 4:
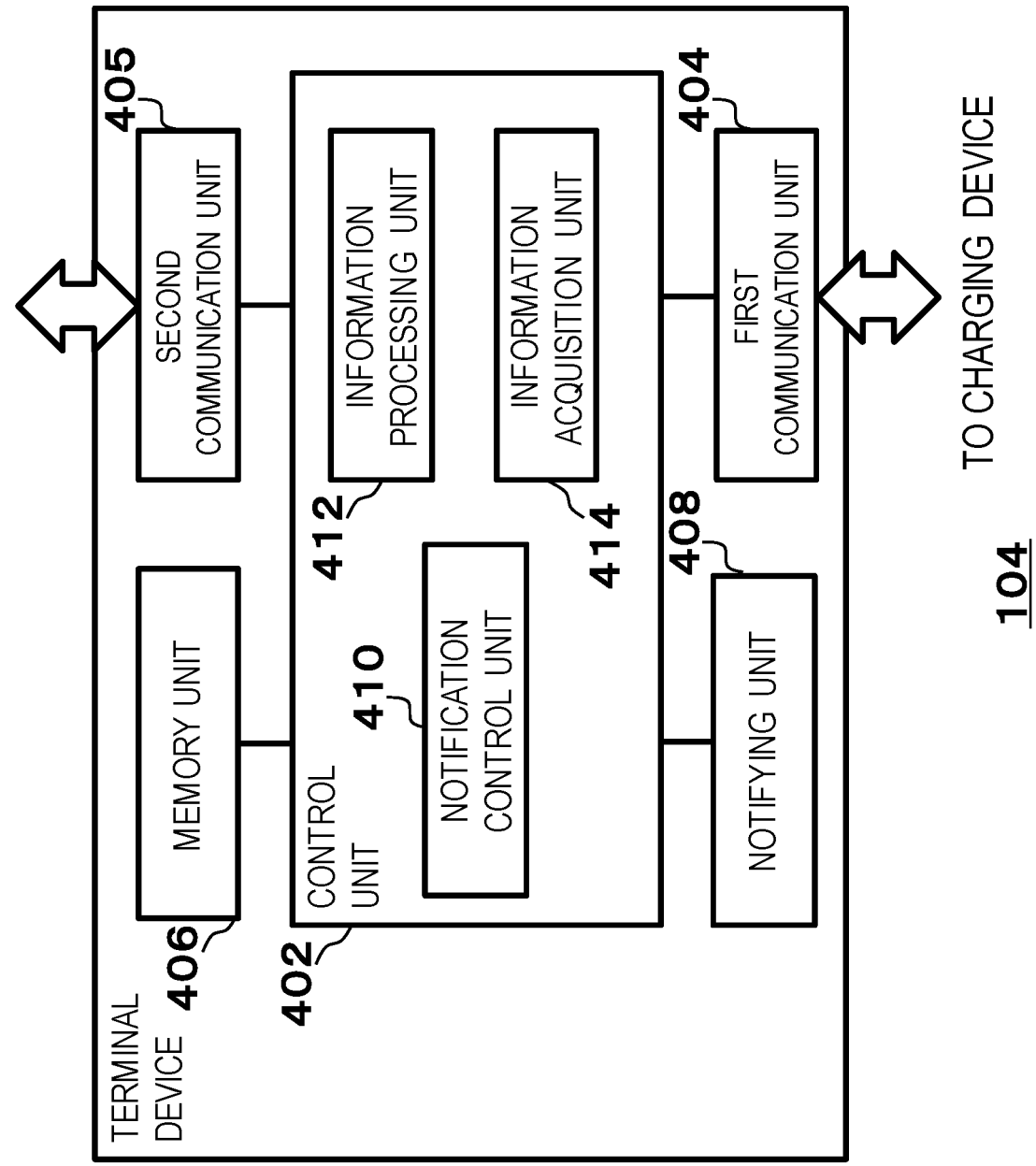
FIG. 4 is a block diagram schematically illustrating a configuration of the terminal device according an embodiment of the present disclosure.

FIG. 4 is a block diagram schematically illustrating a configuration of the terminal device according to an embodiment of the present disclosure. The terminal device 104 includes a control unit 402, a first communication unit 404, a second communication unit 405, a memory unit 406, and a notifying unit 408. The control unit 402 may include a notification control unit 410, an information processing unit 412, and an information acquisition unit 414. The control unit 402 may be configured to perform similar functions to those of these components, instead of including these components. In this case, the server 108 may provide, to the terminal 104, a program for causing the control unit 402 to execute the similar functions to those of these components, the data, and the like. Note that the program may be provided in a form (a so-called "application (APP)") installed in the terminal device 104.

The control unit 402 controls the first communication unit 404, and communicates with the communication unit 204 in the charging device 102. The control unit 402 also controls the second communication unit 405, and communicates with a communication unit (described later) in the server 108. The control unit 402 uses the information acquisition unit 414 to acquire various information including the information about the battery 208 and the battery 302 through these communications. The control unit 402 uses the information processing unit 412 to process the acquired information.

The memory unit 406 stores various information such as the information acquired by the information acquisition unit 414 and the information processing unit 412.

In an example, the notifying unit 408 may be a display device such as a liquid crystal display, and an organic electro luminescence (EL) display. In this example, the control unit 402 causes the display device to display the information acquired by the information acquisition unit 414 and/or the information processing unit 412. This enables the information to be presented to the user. Such information may include, for example, various information relating to the battery, and specifically may include a remaining amount of charge of the battery, information for warning of reduction in the remaining amount of charge of the battery, information for prompting charging of the battery, a time period required for charging the battery, information indicating degradation of the battery, the number of times of charging of the battery (per one day, per one week, per one month, and the like), a time period elapsed since the last charging of the battery, and the like. In addition, the notifying unit 408 may display such information in a banner or pup-up on the display device, to thereby present it to the user. Furthermore, the notifying unit 408 may also present such information to the user using push notification by application.

In another example, the notifying unit 408 may be a speaker that provides the information to the user using voice or sound, or may be a vibrator that provides the information to the user using vibration.

Figure 5:
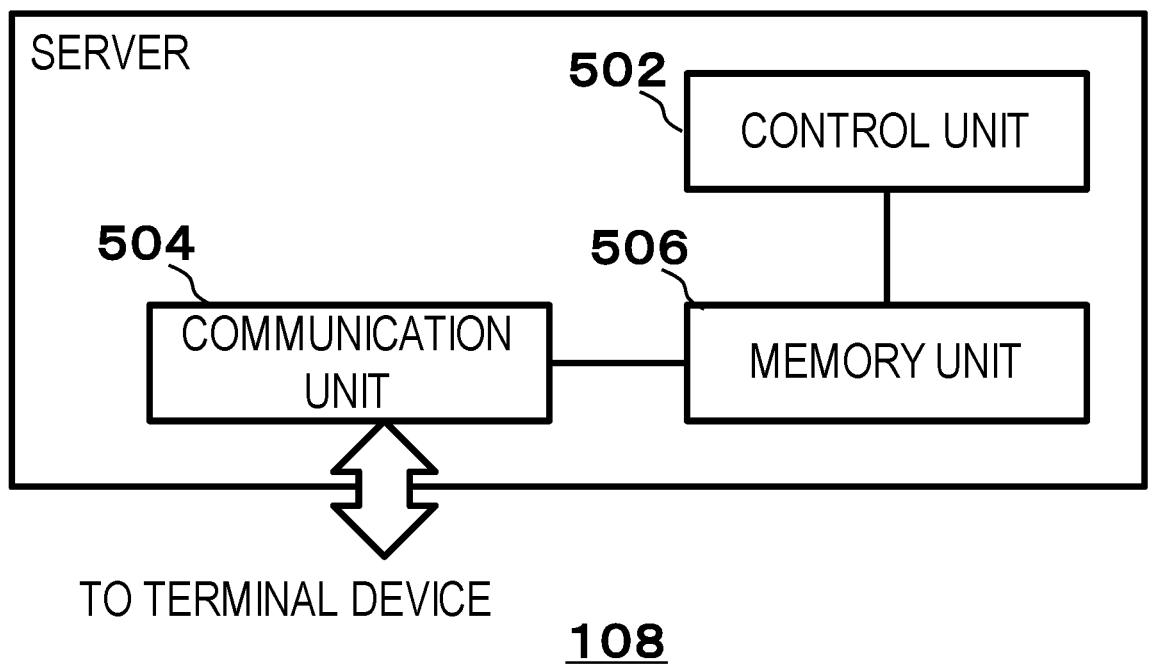
FIG. 5 is a block diagram schematically illustrating a configuration of a server according to an embodiment of the present disclosure.

FIG. 5 is a block diagram schematically illustrating a configuration of the server according to an embodiment of the present disclosure. The server 108 may include a control unit 502, a communication unit 504, and a memory unit 506. The communication unit 504 communicates with the second communication unit 405 in the terminal device 104 through the internet or the like. The communication unit 504 may also be capable of communicating with a plurality of the terminal devices 104. The control unit 502 may receive, from the terminal device 104, various information including information relating to the battery 208 and the battery 302 via the communication unit 504, and store such information in the memory unit 506.

Figure 6:
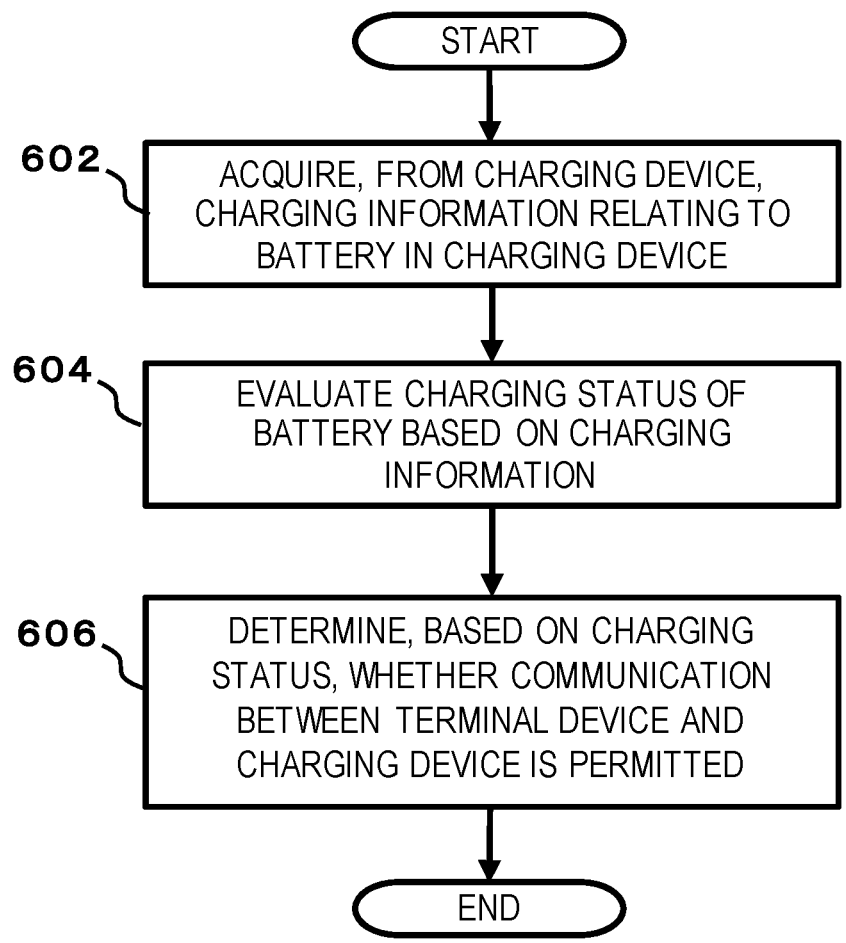
FIG. 6 is a flowchart of an operating method for the terminal device, according to an embodiment of the present disclosure.

FIG. 6 is a flowchart of an operating method for the terminal device, according to an embodiment of the present disclosure. Here, a description is made assuming that the control unit 402 in the terminal device 104 performs all steps. However, it should be noted that some of the steps may be performed by another component in the terminal device 104. In addition, it will be appreciated that the present embodiment may be implemented as a program, when executed by a computer such as the terminal device 104, causing the computer to perform the method, or a computer-readable storage medium storing the program. The same can be also applied to examples in FIGS. 8A, 8B, 8C, and 10 which are described later.

In step 602, the control unit 402 acquires, from the charging device 102, charging information relating to the battery 208 in the charging device 102.

The process proceeds to step 604, and the control unit 402 evaluates a charging status of the battery 208 based on the charging information acquired in step 602. Here, the charging status includes a remaining amount of charge of the battery 208, degradation of the battery, the number of times of charging of the battery, a time period elapsed since the last charging of the battery, and the like.

Figure 7:
FIG. 7 illustrates an example of notification issued in the process in FIG. 6.

FIG. 7 illustrates an example in which the notifying unit 408 in the terminal device 104 provides the information to the user in the process in FIG. 6. When acquiring the charging information and the charging status of the battery 208 in step 602 or 604, the control unit 402 may present these information items to the user via the notifying unit 408. In this example, the notifying unit 408 is a display unit 702 such as a liquid crystal display, and information 704 relating to a remaining battery level of the charging device is displayed on the display unit 702. Note that the information 704 relating to a remaining battery level of the charging device may be also displayed in a percentage expression, for example.

The process proceeds to step 606, and the control unit 402 determines, based on the charging status acquired in step 604, whether the communication between the terminal device 104 and the charging device 102 is permitted. Specific examples will be described later.

Since the processes in FIG. 6 are performed by the terminal device 104, the charging device 102 that communicates with the terminal device 104 may be configured to operate corresponding to the processes in FIG. 6. For example, the control unit 202 in the charging device 102 may be configured to transmit the charging information relating to the battery 208, via the communication unit 204, to the terminal device 104 that communicates with the charging device 102, and to receive, from the terminal device 104, the information as to whether the communication between the terminal device 104 and the charging device 102 is permitted, which is determined by the terminal device 104 based on the charging status of the battery 208 evaluated from the charging information.

Figure 8A:
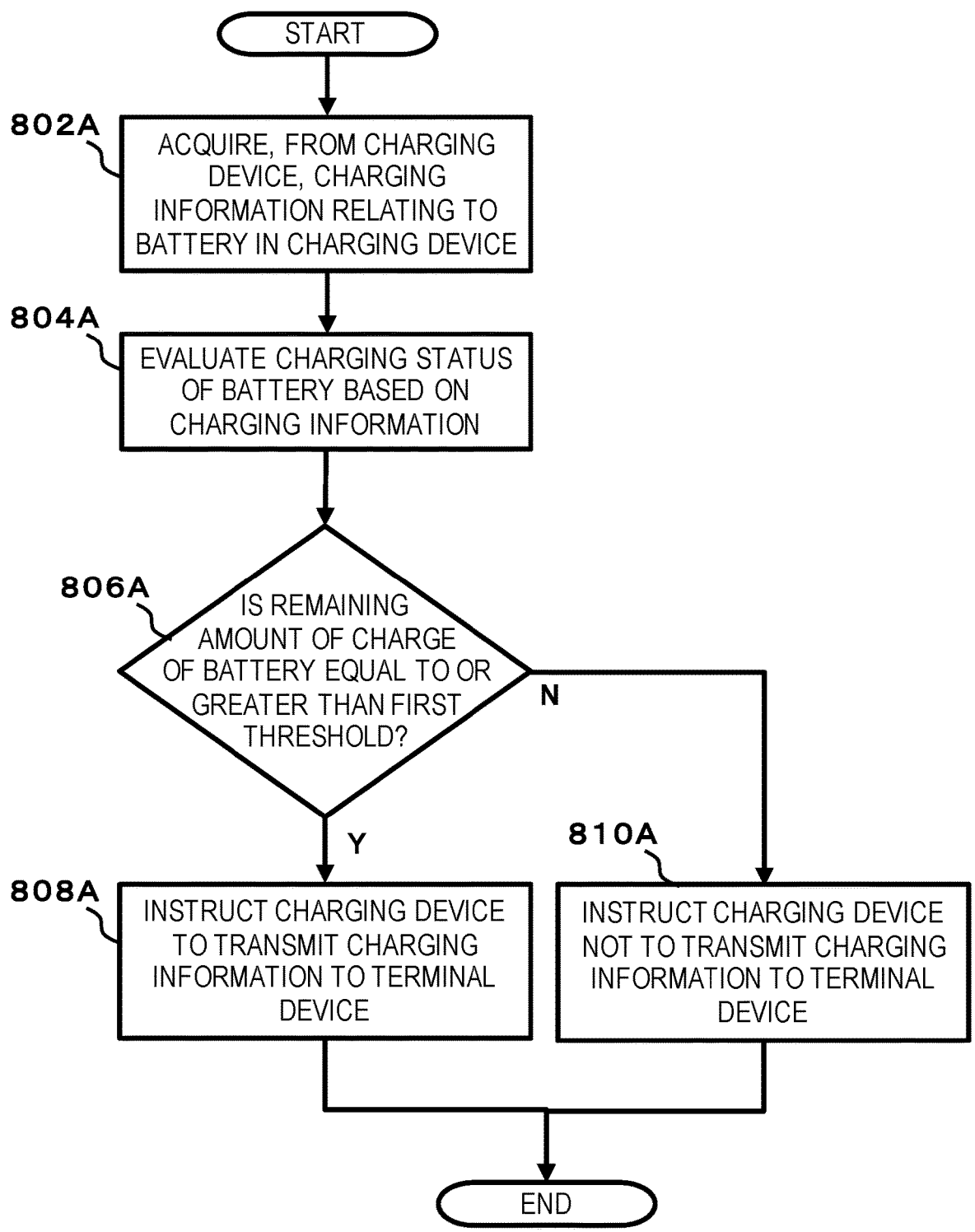
FIG. 8A is a flowchart of an operating method for the terminal device, according to an embodiment of the present disclosure.

FIG. 8A is a flowchart of an operating method for the terminal device, according to an embodiment of the present disclosure. Since processes in steps 802A and 804A are the same as the processes in steps 602 and 604, description thereof will be omitted.

In step 806A, the control unit 402 determines whether the remaining amount of charge of the battery 208 is equal to or greater than a first threshold, based on the charging status of the battery 208, which is acquired in step 804A. When the remaining amount of charge of the battery 208 is equal to or greater than the first threshold ("Y" in step 806A), the process proceeds to step 808A. Note that the first threshold is, for example, 20% of the maximum value of the remaining amount of charge of the battery 208, but 20% is illustrative only, and the first threshold is not limited to this value. In step 808A, the control unit 402 instructs the charging device 102 to transmit the charging information to the terminal device 104. On the other hand, when the remaining amount of charge of the battery 208 is less than the first threshold ("N" in step 806A), the process proceeds to step 810A. In step 810A, the control unit 402 instructs the charging device 102 not to transmit the charging information to the terminal device 104.

Since the processes in FIG. 8A are performed by the terminal device 104, the charging device 102 that communicates with the terminal device 104 may be configured to operate corresponding to the processes in FIG. 8A. For example, the control unit 202 in the charging device 102 may be configured to transmit the charging information to the terminal device 104 via the communication unit 204 when the remaining amount of charge of the battery 208 is equal to or greater than the first threshold, and may be configured not to transmit the charging information to the terminal device 104 when the remaining amount of charge of the battery 208 is less than the first threshold.

Note that, when the battery 208 receives supply of the electric power via the power interface 212 in the charging device 102, the control unit 402 in the terminal device 104 may instruct the charging device 102 to transmit the charging information to the terminal device 104 regardless of the remaining amount of charge of the battery 208. When the battery 208 receives supply of the electric power via the power interface 212, the charging device 102 (or the control unit 202 in the charging device 102) may be configured to transmit the charging information to the terminal device 104 via the communication unit 204 regardless of the remaining amount of charge of the battery 208.

In addition, when the communication connection with the charging device 102 is first established, the control unit 402 in the terminal device 104 may instruct the charging device 102 to transmit the charging information to the terminal device 104 regardless of the remaining amount of charge of the battery 208. When the communication connection with the terminal device 104 is first established, the charging device 102 (or the control unit 202 in the charging device 102) may be configured to transmit the charging information to the terminal device 104 via the communication unit 204 regardless of the remaining amount of charge of the battery 208.

Figure 8B:
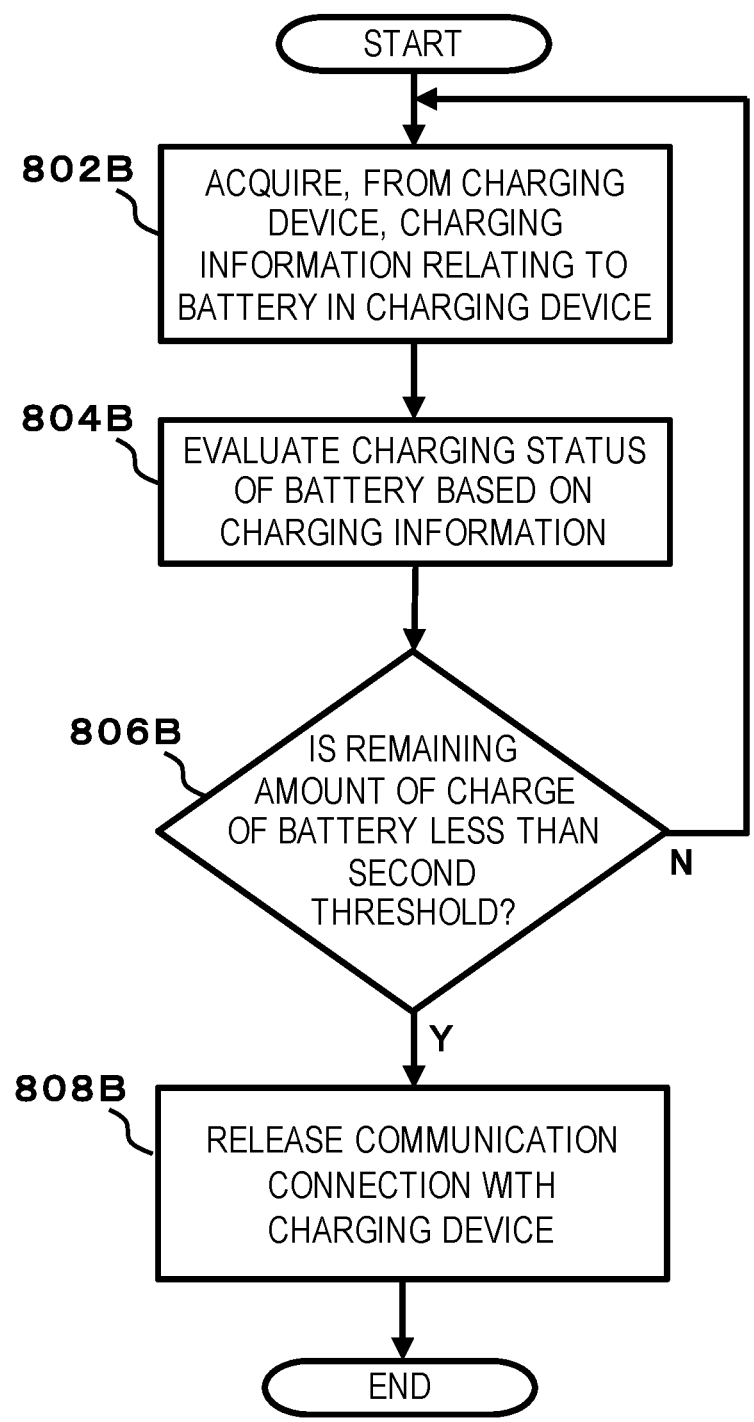
FIG. 8B is a flowchart of an operating method for the terminal device, according to an embodiment of the present disclosure.

FIG. 8B is a flowchart of an operating method for the terminal device, according to an embodiment of the present disclosure. Since processes in steps 802B and 804B are the same as the processes in steps 602 and 604, description thereof will be omitted.

In step 806B, the control unit 402 determines whether the remaining amount of charge of the battery 208 is less than a second threshold, based on the charging status of the battery 208, which is acquired in step 804B. Note that the second threshold is, for example, 20% of the maximum value of the remaining amount of charge of the battery 208, but 20% is illustrative only, and the second threshold is not limited to this value. When the remaining amount of charge of the battery 208 is less than the second threshold ("Y" in step 806B), the process proceeds to step 808B. In step 808B, the control unit 402 releases the communication connection with the charging device 102. On the other hand, when the remaining amount of charge of the battery 208 is equal to or greater than the second threshold ("N" in step 806B), the process returns to before step 802B.

Since the processes in FIG. 8B are performed by the terminal device 104, the charging device 102 that communicates with the terminal device 104 may be configured to operate corresponding to the processes in FIG. 8B. For example, the control unit 202 in the charging device 102 may be configured to release the communication connection with the terminal device 104 when the remaining amount of charge of the battery 208 is less than the second threshold. In addition, the processes in FIG. 8A and the processes in FIG. 8B may be combined, and the control unit 402 in the terminal device 104 may be configured to instruct the charging device 102 not to transmit the charging information to the terminal device 104 when the remaining amount of charge of the battery 208 is less than the first threshold and equal to or greater than the second threshold, and may be configured to release the communication connection with the charging device 102 when the remaining amount of charge of the battery 208 is less than the second threshold. In this case, it is assumed that the first threshold is greater than the second threshold. Note that the control unit 202 in the charging device 102 may be configured not to transmit the charging information to the terminal device 104 when the remaining amount of charge of the battery 208 is less than the first threshold and equal to or greater than the second threshold, and may be configured to release the communication connection with the terminal device 104 when the remaining of amount of charge of the battery 208 is less than the second threshold.

Figure 8C:
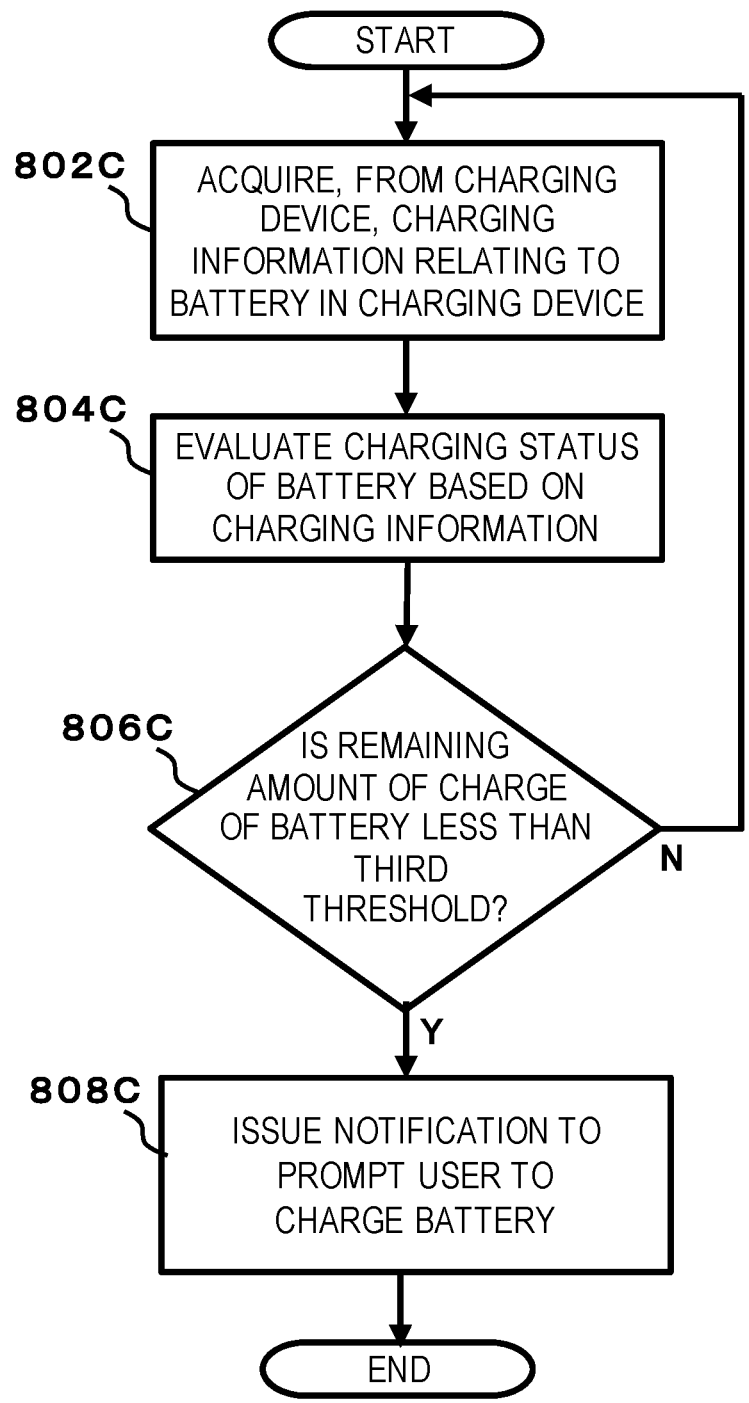
FIG. 8C is a flowchart of an operating method for the terminal device, according to an embodiment of the present disclosure.

FIG. 8C is a flowchart of an operating method for the terminal device, according to an embodiment of the present disclosure. Since processes in steps 802C and 804C are the same as the processes in steps 602 and 604, description thereof will be omitted.

In step 806C, the control unit 402 determines whether the remaining amount of charge of the battery 208 is less than a third threshold, based on the charging status of the battery 208, which is acquired in step 804C. The third threshold is, for example, 20% of the maximum value of the remaining amount of charge of the battery 208, but 20% is illustrative only, and the third threshold is not limited to this value. When the remaining amount of charge of the battery 208 is less than the third threshold ("Y" in step 806C), the process proceeds to step 808C. In step 808C, the control unit 402 issues notification to prompt the user to charge the battery 208. In response to this notification, the user may connect the power interface 212 in the charging device 102 to the power supply 110 to charge the battery 208. Alternatively, the control unit 202 in the charging device 102 may be configured to charge the battery 208 in response to an instruction from the terminal device 104, and therefore, the control unit 202 in the charging device 102 may charge the battery 208 when the instruction is sent to the charging device 102 by the user's operation of the terminal device 104 (or a program installed in the terminal device 104) performed in response to the above-described notification.

Figure 9:
FIG. 9 illustrates an example of notification issued in the process in FIG. 8C.

FIG. 9 illustrates an example of notification issued in step 808C. The control unit 402 in the terminal device 104 causes the notifying unit 408 (in this example, a display 902) to display a message 904 with a content of "Remaining battery level of charging device is low. Please charge battery." thereon, for example.

Returning to FIG. 8C, when the remaining amount of charge of the battery 208 is equal to or greater than the third threshold ("N" in step 806C), the process returns to before step 802C.

Since the processes in FIG. 8C are performed by the terminal device 104, the charging device 102 that communicates with the terminal device 104 may be configured to operate corresponding to the processes in FIG. 8C. For example, the control unit 202 in the charging device 102 may be configured to, when receiving an instruction for charging the battery 208 from the terminal device 104, charge the battery 208 in response to the instruction, in the case where the remaining amount of charge of the battery 208 is less than the third threshold. Note that at least two or more of the processes in FIG. 8A, the processes in FIG. 8B, and the processes in FIG. 8C may be combined and performed. In this case, the first threshold, the second threshold, and the third threshold may be different from one another, or at least two of them may be equal to each other.

Figure 10:
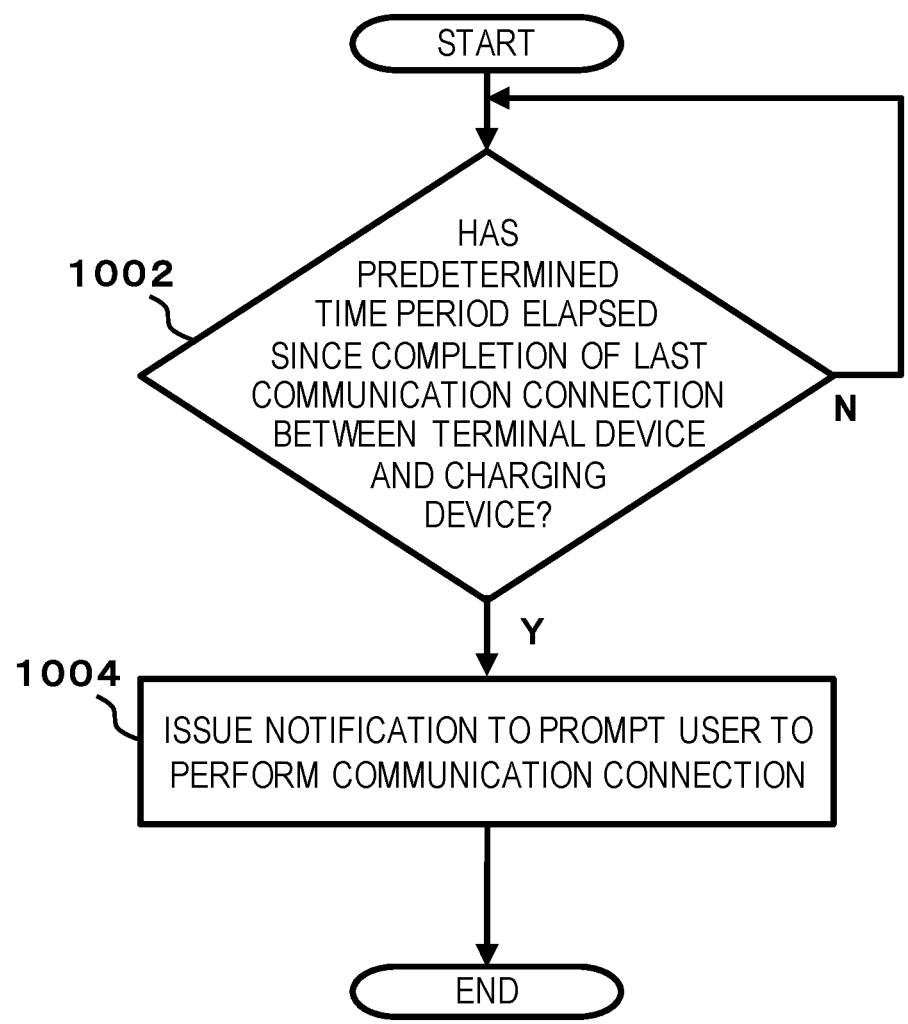
FIG. 10 is a flowchart of an operating method for the terminal device, according to an embodiment of the present disclosure.

FIG. 10 is a flowchart of an operating method for the terminal device, according to an embodiment of the present disclosure. In step 1002, the control unit 402 in the terminal device 104 determines whether a predetermined time period has elapsed since the completion of the last communication connection between the terminal device 104 and the charging device 102. When it is determined that the predetermined time period has elapsed ("Y" in step 1002), the process proceeds to step 1004. In step 1004, the control unit 402 issues the notification to prompt the user to perform the communication connection. In response to this notification, the user operates the terminal device 104 (or a program installed in the terminal device 104) to perform the communication connection between the terminal device 104 and the charging device 102. At this time, the control unit 402 in the terminal device 104 may send, to the charging device 102, an instruction to perform the communication connection. The control unit 202 in the charging device 102 may be also configured to perform the communication connection in response to the instruction.

Figure 11:
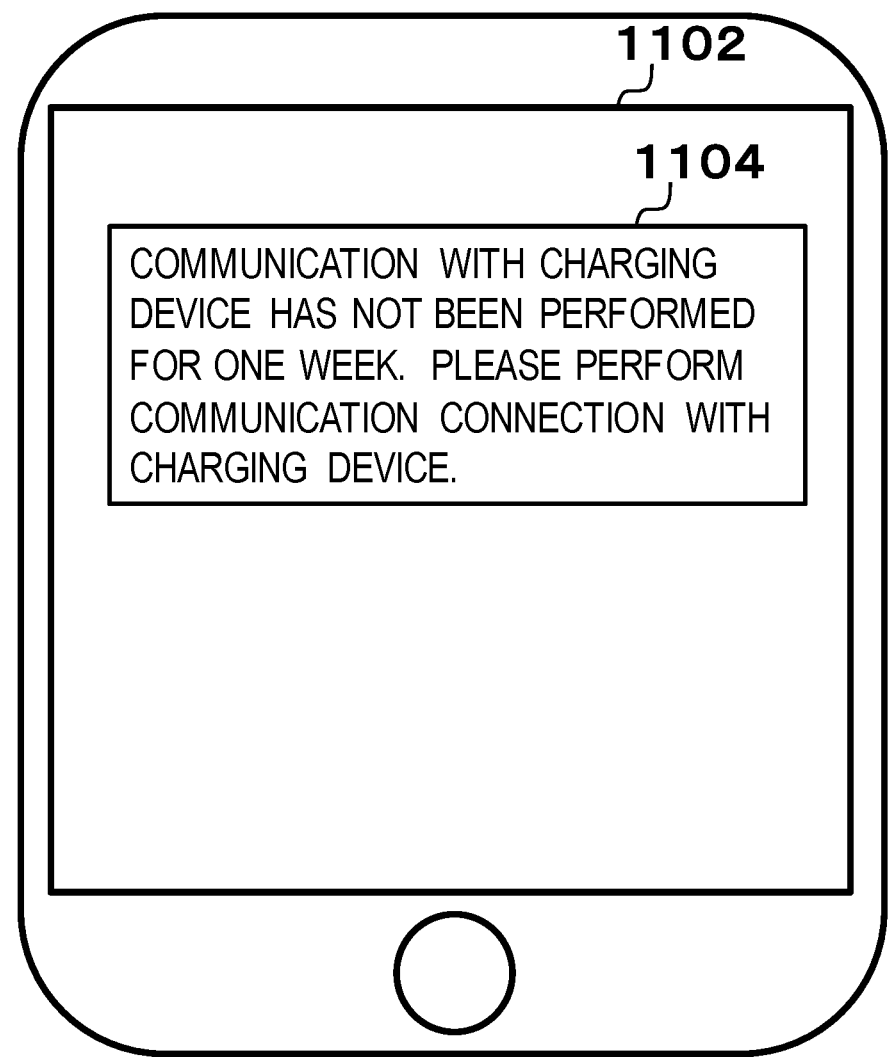
FIG. 11 illustrates an example of notification issued in the process in FIG. 10.

FIG. 11 illustrates an example of notification issued in step 1004. When the above-described predetermined time period is one week, the control unit 402 in the terminal device 104 causes the notifying unit 408 (in this example, a display 1102) to display a message 1104 with a content of "Communication with charging device has not been performed for one week. Please perform communication connection with charging device." thereon, for example.

Returning to FIG. 10, when it is not determined that the predetermined time period has elapsed ("N" in step 1002), the process returns to before step 1002.

Since the processes in FIG. 10 are performed by the terminal device 104, the charging device 102 that communicates with the terminal device 104 may be configured to operate corresponding to the processes in FIG. 10. For example, the control unit 202 in the charging device 102 may be configured to, when receiving, from the terminal device 104, an instruction for performing the communication connection with the terminal device 104, perform the communication connection in response to the instruction, in the case where the communication connection between the terminal device 104 and the charging device 102 has not been performed for at least the predetermined time period.

In the embodiments of the present disclosure, when the charging device 102 and the terminal device 104 communicate with each other, the terminal device 104 basically receives the charging information from the charging device 102 periodically, and stores the received charging information in the memory unit 406 and the like.

On the other hand, in another embodiment, the control unit 402 in the terminal device 104 may be configured to estimate the charging information, when the terminal device 104 does not receive the charging information from the charging device 102. By way of example, a case is considered in which the charging information relates to the remaining amount of charge of the battery 208. The terminal device 104 stores transition of the remaining amount of charge of the battery 208, and uses it for the estimation of the remaining amount of charge. For example, the control unit 402 in the terminal device 104 calculates a reduction amount of the remaining amount of charge per unit time (e.g., one minute, one hour, or the like) based on the stored transition of the remaining amount of charge. The control unit 402 may estimate the remaining amount of charge based on the calculated reduction amount, the remaining amount of charge stored at a previous time point, an elapsed time period from the previous time point to the present time point, and the like. Note that, when the battery 208 in the charging device 102 is charged using the power supply 110 via the power interface 212, the remaining amount of charge of the battery 208 increases, and therefore, it is difficult to use the transition of the remaining amount of charge of the battery 208 for the estimation of the remaining amount of charge. Therefore, in an example, the terminal device 104 may be configured not to store the transition of the remaining amount of charge while the battery 208 is charged or not to use the transition for the estimation of the remaining amount of charge.

In the embodiments of the present disclosure, the processes performed by the terminal device 104 (or the processes by the control unit 402 in the terminal device 104 or the processes according to the program installed in the terminal device 104) may include more types of processes.

In an example, the terminal device 104 may issue the notification to prompt the user to charge the battery 208 in the charging device 102 at the timing at which the remaining amount of charge of the battery 208 is likely to be zero. For example, when the remaining amount of charge of the battery 208 falls below 20% of the maximum value, the terminal device 104 may issue the notification. In addition, the terminal 104 may also issue an alert notifying the user of the running out of charge at the timing at which the remaining amount of charge of the battery 208 in the charging device 102 becomes zero.

In an example, the terminal device 104 may issue the notification about the completion of charging at the timing at which charging of the battery 302 in the aerosol generation device 106 or the battery 208 in the charging device 102 is completed. For example, the terminal device 104 may always communicate with the charging device 102 while the battery 208 in the charging device 102 is supplied with the electric power via the power interface 212, so that the terminal device 104 can acquire the information relating to the states of charge of the battery 208 and the battery 302. The terminal device 104 may issue a notification that charging of the battery 208 and/or the battery 302 has been completed at each charging level of 20%, 40%, 60%, 80%, and 100%, at the corresponding completion timing.

In an example, the terminal device 104 may update the information relating to the remaining amount of charge of the battery 302 in the aerosol generation device 106 or the battery 208 in the charging device 102 at the timing at which the communication connection with the charging device 102 is started, and issue the notification about the updated information. Note that the information relating to the remaining amount of charge of the battery 302 in the aerosol generation device 106 and/or the battery 208 in the charging device 102 may relate to the remaining amount of charge of the battery 302 and/or the battery 208, and may be notified in a percentage expression, for example. In addition, the information relating to the remaining amount of charge of the battery 208 in the charging device 102 may be notified as a state of charge in which the charging device 102 can charge the battery 302 in the aerosol generation device 106. For example, when the charging device 102 can charge the battery 302 in the aerosol generation device 106 by 80%, the information relating to the remaining amount of charge of the battery 208 in the charging device 102 may be notified by displaying "the aerosol generation device 106 is chargeable to 80%" or the like.

In the embodiments of the present disclosure, the terminal device 104 may be configured to adjust the frequency of the communication with the charging device 102 according to the status. Alternatively, the program installed in the control unit 402 or the terminal device 104 cause the terminal device 104 to operate according to the program. In an example, when the charging device 102 is charged via the power interface 212 or the like, the terminal device 104 may always communicate with the charging device 102. In addition, when the charging device 102 charges the battery 302 in the aerosol generation device 106, the terminal device 104 may always communicate with the charging device 102. When the charging device 102 is not charged, the terminal device 104 may communicate with the charging device 102 when the remaining amount of charge of the battery 208 in the charging device 102 falls below a predetermined threshold. The predetermined threshold is, for example, 20% of the maximum value of the remaining amount of charge of the battery 208, but 20% is illustrative only, and the predetermined threshold is not limited to this value. In each case described above, the data that is communicated between the terminal device 104 and the charging device 102 may include the remaining amount of charge of the battery 208 in the charging device 102, the remaining amount of charge of the battery 302 in the aerosol generation device 106, a product ID (IDentification) of the charging device 102, the date and time when the communication is performed, and the like.

In the embodiments of the present disclosure, the terminal device 104 may acquire the information including a user ID of the charging device 102, a product ID, a date of use (including a date of the last use) of the charging device 102, and an estimated last survival date of the user at the timing at which the communication connection between the terminal device 104 and the charging device 102 is established, and send the information to the server 108. The information may be acquired, for example, once per day. The control unit 502 in the server 108 may receive these information items via the communication unit 504, and store the information items in the memory unit 506.

Figure 12:
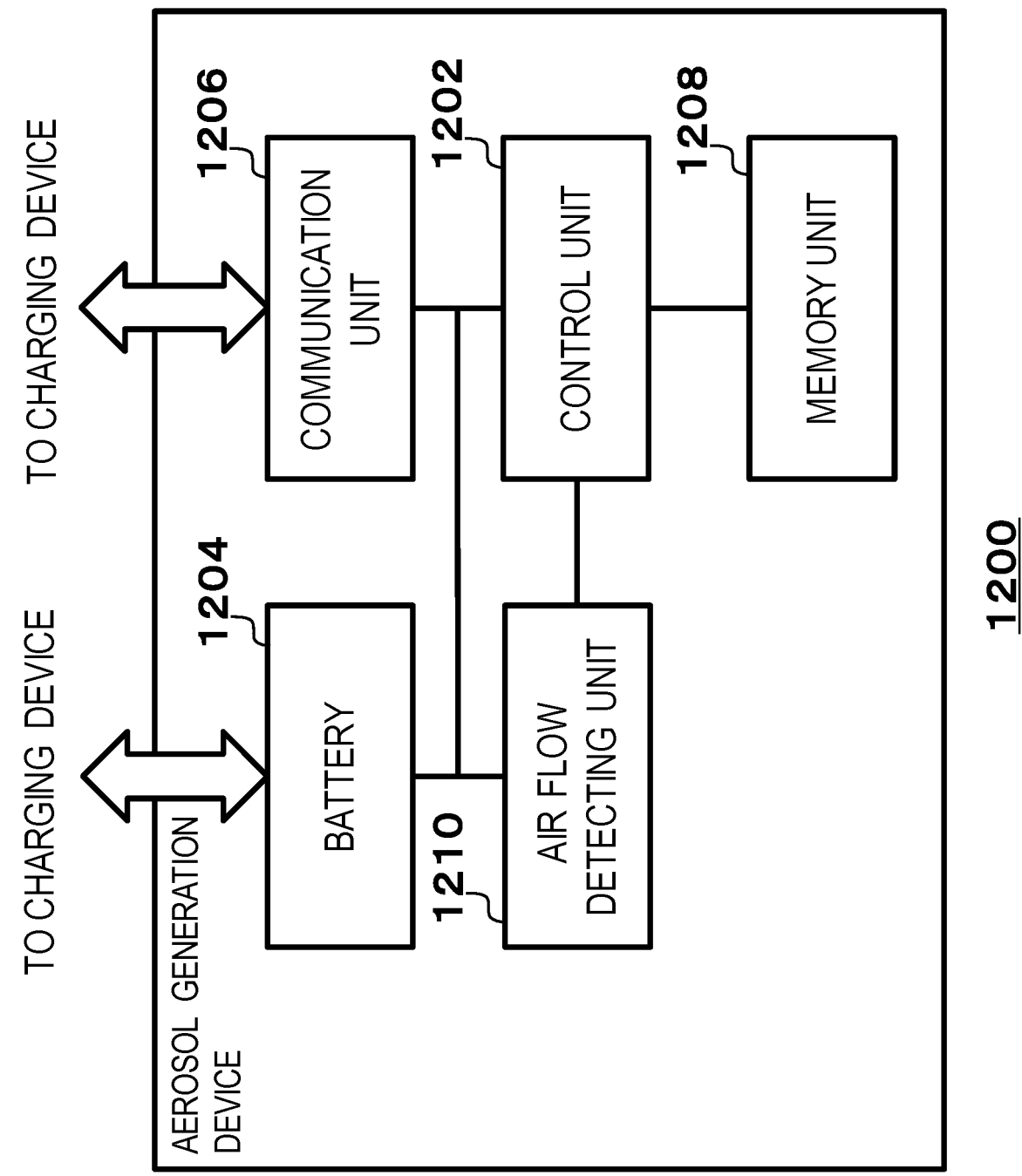
FIG. 12 is a block diagram schematically illustrating a configuration of an aerosol generation device according to an embodiment of the preset disclosure.

FIG. 12 is a block diagram schematically illustrating a configuration of an aerosol generation device according to an embodiment of the preset disclosure. An aerosol generation device 1200 may include a control unit 1202, a battery 1204, a communication unit 1206, a memory unit 1208, and an air flow detecting unit 1210.

The air flow detecting unit 1210 detects an air flow generated by a user's inhalation on the aerosol generation device 1200.

The control unit 1202 controls each component in the aerosol generation device 1200. In addition, the control unit 1202 may generate various information such as air flow information based on the air flow detected by the air flow detecting unit 1210, for example. Here, the air flow information is information relating to the air flow generated by the user's inhalation on the aerosol generation device 1200.

The memory unit 1208 can store various information acquired by the aerosol generation device 1200, the various information including, for example, the air flow information generated by the control unit 1202.

The communication unit 1206 transmits, to the charging device 102, the information acquired by the aerosol generation device 1200, the information including the air flow information generated by the control unit 1202. In the charging device 102, the information may be received by the information acquisition unit 222 via the charging port 210. The communication unit 1206 may transmit the information to the charging device 102 by other communication methods such as BLE and Wi-Fi, instead of via the charging port 210 or in parallel to the method via the charging port 210.

Figure 13:
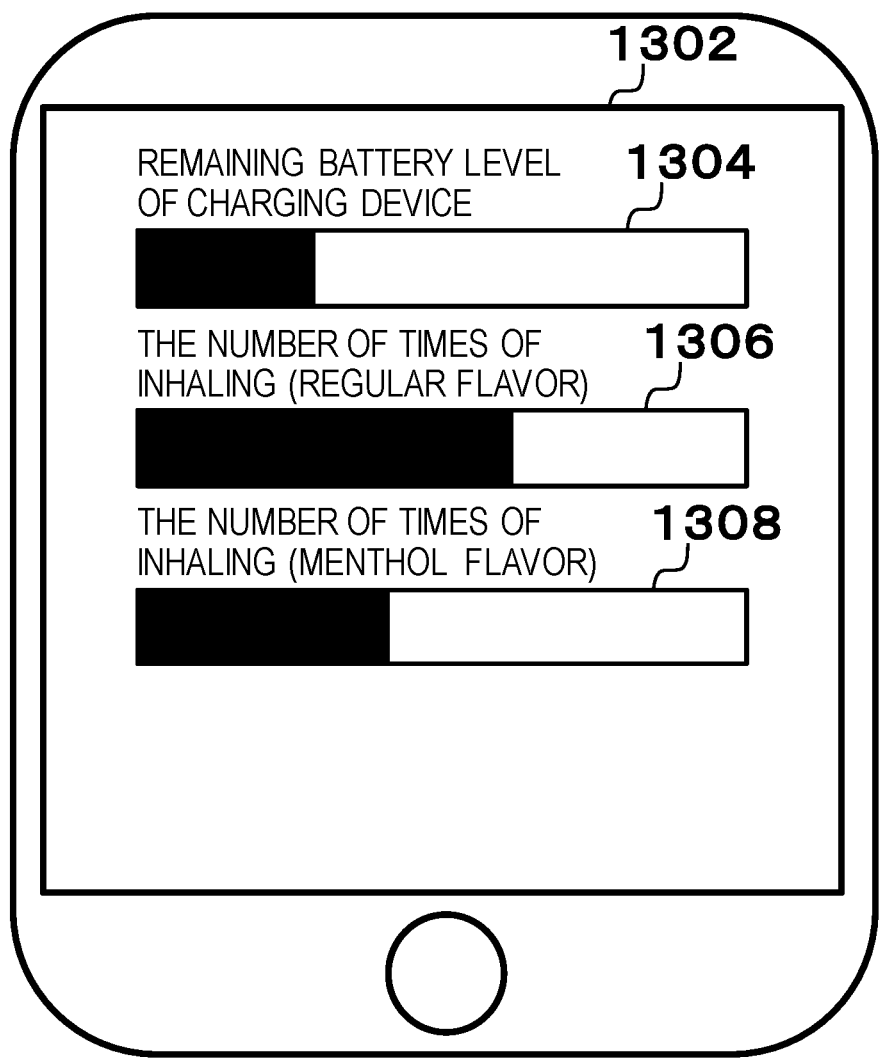
FIG. 13 illustrates an example in which the terminal device provides information to a user based on the information acquired from the aerosol generation device.

The aerosol generation device 1200 illustrated in FIG. 12 can acquire more information as compared with the aerosol generation device 106 illustrated in FIG. 3. The charging device 102 and the terminal device 104 can acquire such information, thereby enabling the provision of more information to the user. FIG. 13 illustrates an example in which the terminal device 104 provides the information to the user based on the information acquired from the aerosol generation device 1200. In this example, information including information 1304 relating to the remaining battery level of the charging device 102, the number of times 1306 of inhaling the aerosol source (regular flavor) by the user using the aerosol generation device 1200, the number of times 1308 of inhaling the aerosol source (menthol flavor) by the user using the aerosol generation device 1200, and the like is displayed on the notifying unit 408 (in this example, a display 1302).

The embodiments of the present disclosure have been described thus far, but it should be understood that these embodiments are only illustration, and do not limit the scope of the present disclosure. It should be understood that modification, addition, alteration and the like of the embodiments can be properly performed without departing from the gist and scope of the present disclosure. The scope of the present disclosure should not be limited by any of the aforementioned embodiments, but should be specified by only the claims and the equivalents of the claims.

REFERENCE SIGNS LIST

100 • • • system, 102, 102A, 102B • • • charging device, 104, 104A, 104B • • • terminal device, 106, 106A, 106B • • • aerosol generation device, 108 • • • server, 110 • • • power supply, 202 • • • control unit, 204 • • • communication unit, 206 • • • memory unit, 208 • • • battery, 210 • • • charging port, 212 • • • power interface, 214 • • • first notifying unit, 216 • • • second notifying unit, 218 • • • battery control unit, 220 • • • notification control unit, 222 • • • information acquisition unit, 224 • • • first path, 226 • • • second path, 302 • • • battery, 402 • • • control unit, 404 • • • first communication unit, 405 • • • second communication unit, 406 • • • memory unit, 408 • • • notifying unit, 410 • • • notification control unit, 412 • • • information processing unit, 414 • • • information acquisition unit, 502 • • • control unit, 504 • • • communication unit, 506 • • • memory unit, 702 • • • display, 704 • • • information, 902 • • • display, 904 • • • message, 1102 • • • display, 1104 • • • message, 1200 • • • aerosol generation device, 1202 • • • control unit, 1204 • • • battery, 1206 • • • communication unit, 1208 • • • memory unit, 1210 • • • air flow detecting unit, 1302 • • • display, 1304, 1306, 1308 • • • information

The invention claimed is:

1. An operating method for a terminal device that communicates with a charging device for charging an aerosol generation device, the method comprising:
acquiring, from the charging device, charging information relating to a battery in the charging device;
valuating a charging status of the battery based on the charging information; and
determining, based on the charging status, whether communication between the terminal device and the charging device is permitted.

2. The method according to claim 1, further comprising:
instructing the charging device to transmit the charging information to the terminal device, when it is determined, based on the charging status, that a remaining amount of charge of the battery is equal to or greater than a first threshold; and
instructing the charging device not to transmit the charging information to the terminal device, when it is determined, based on the charging status, that the remaining amount of charge of the battery is less than the first threshold.

3. The method according to claim 1, further comprising:
releasing a communication connection with the charging device, when it is determined, based on the charging status, that the remaining amount of charge of the battery is less than a second threshold.

4. The method according to claim 1, further comprising:
instructing the charging device to transmit the charging information to the terminal device regardless of the remaining amount of charge of the battery, when the battery receives supply of electric power via a power interface in the charging device.

5. The method according to claim 1, further comprising:
instructing the charging device to transmit the charging information to the terminal device regardless of the remaining amount of charge of the battery, when the communication connection with the charging device is first established.

6. The method according to claim 1, further comprising:
issuing a notification to prompt a user to charge the battery, when it is determined, based on the charging status, that the remaining amount of charge of the battery is less than a third threshold.

7. The method according to claim 1, further comprising:
issuing a notification to prompt a user to perform the communication connection between the terminal device and the charging device, when the communication connection is not performed for at least a predetermined time period.

8. The method according to claim 1, further comprising:
when the terminal device does not receive the charging information from the charging device, estimating the charging information based on transition of the charging information stored for the battery when not being charged.

9. A program embodied on a non-transitory computer readable medium for causing a terminal device to perform the method according to claim 1, the terminal device that communicates with a charging device for charging an aerosol generation device.

10. A charging device for charging an aerosol generation device, comprising:
a battery;
a power interface for supplying electric power to the battery;
a control unit; and
a communication unit,
wherein the control unit is configured:
to transmit charging information relating to the battery, via the communication unit, to a terminal device that communicates with the charging device; and
to receive, from the terminal device, information as to whether communication between the terminal device and the charging device is permitted, which is determined by the terminal device based on a charging status of the battery evaluated from the charging information.

11. The charging device according to claim 10, wherein the control unit is further configured:
to transmit the charging information to the terminal device via the communication unit when a remaining amount of charge of the battery is equal to or greater than a first threshold; and
not to transmit the charging information to the terminal device when the remaining amount of charge of the battery is less than the first threshold.

12. The charging device according to claim 10, wherein the control unit is further configured to release a communication connection with the terminal device when the remaining amount of charge of the battery is less than a second threshold.

13. The charging device according to claim 10, wherein the control unit is further configured to transmit the charging information to the terminal device via the communication unit regardless of the remaining amount of charge of the battery, when the battery receives supply of electric power via the power interface.

14. The charging device according to claim 10, wherein the control unit is further configured to transmit the charging information to the terminal device via the communication unit regardless of the remaining amount of charge of the battery, when the communication connection with the terminal device is first established.

15. The charging device according to claim 10, wherein the control unit is further configured to, when receiving an instruction for charging the battery from the terminal device, charge the battery in response to the instruction, in a case where the remaining amount of charge of the battery is less than a third threshold.

16. The charging device according to claim 10, wherein the control unit is further configured to, when receiving, from the terminal device, an instruction for performing the communication connection with the terminal device, perform the communication connection in response to the instruction, in the case where the communication connection between the terminal device and the charging device is not performed for at least a predetermined time period.

17. The charging device according to claim 10, further comprising:
a charging port for supplying the electric power to the aerosol generation device;
a first path provided between the battery and the charging port to supply the electric power from the battery to the aerosol generation device; and
a second path provided between the power interface and the charging port to supply the electric power from the power interface to the aerosol generation device not via the battery.

18. The charging device according to claim 10, wherein the control unit is further configured to control to charge a battery in the aerosol generation device in preference to the battery in the charging device, when the aerosol generation device is connected to the charging device via the charging port.

19. The charging device according to claim 10, further comprising:
a first notifying unit for issuing a notification about the charging status of the battery in the aerosol generation device; and
a second notifying unit for issuing a notification about the charging status of the battery in the charging device.

20. A system, comprising:
the charging device according to claim 10,
the terminal device; and
a server that transmits and receives data to and from the terminal device.

* * * * *